United States Patent
Kawamura

(10) Patent No.: US 9,247,124 B2
(45) Date of Patent: Jan. 26, 2016

(54) IMAGING APPARATUS, SEMICONDUCTOR INTEGRATED CIRCUIT, AND IMAGING METHOD

(71) Applicant: Panasonic Corporation, Osaka (JP)

(72) Inventor: Takashi Kawamura, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 56 days.

(21) Appl. No.: 14/075,506

(22) Filed: Nov. 8, 2013

(65) Prior Publication Data

US 2014/0146219 A1  May 29, 2014

(30) Foreign Application Priority Data

Nov. 29, 2012  (JP) .................................. 2012-261412

(51) Int. Cl.
H04N 5/232 (2006.01)
H04N 5/235 (2006.01)
G02B 7/28 (2006.01)

(52) U.S. Cl.
CPC ......... *H04N 5/23212* (2013.01); *H04N 5/2356* (2013.01); *G02B 7/28* (2013.01); *H04N 5/2353* (2013.01)

(58) Field of Classification Search
CPC .............. H04N 5/2353; H04N 5/2356; H04N 5/23212; G02B 7/28
USPC .................................................. 348/345, 349
See application file for complete search history.

(56) References Cited

U.S. PATENT DOCUMENTS

2009/0059057 A1* 3/2009 Long et al. .................... 348/343
2009/0148147 A1* 6/2009 Fujii et al. ..................... 396/128

FOREIGN PATENT DOCUMENTS

WO   2007/022329 A2   2/2007

OTHER PUBLICATIONS

A. Pentland, "A New Sense for Depth of Field", IEEE Trans. Pattern Analysis and Machine Intelligence vol. 9, No. 4, 1987, pp. 523-531.
M. Subbarao, "Parallel Depth Recovery by Changing Camera Parameters", 2nd International Conference on Computer Vision, (1988), pp. 149-155.
Copending U.S. Appl. No. 13/809,951, filed Jan. 14, 2013.
Copending U.S. Appl. No. 14/123,421, filed Dec. 2, 2013.

* cited by examiner

*Primary Examiner* — Sinh Tran
*Assistant Examiner* — Mark Monk
(74) *Attorney, Agent, or Firm* — Renner, Otto, Boisselle & Sklar, LLP

(57) ABSTRACT

An imaging apparatus includes: an imaging device; a lens optical system including a focus lens for condensing light toward the imaging device; a driving section configured to driving one of the imaging device and the focus lens to change a position to which a focus is adjusted on an object side; a shutter provided at at least one of the imaging device and a position between the lens optical system and the imaging device; and a control unit configured to control the shutter and the driving section, wherein the control unit drives the imaging device or the focus lens such that a focus is adjusted to each of first to third focusing positions of different object distances and controls the shutter and the driving section such that image signals of first to third object images at the first to third focusing positions are obtained by the imaging device.

17 Claims, 9 Drawing Sheets

IMAGING APPARATUS, SEMICONDUCTOR INTEGRATED CIRCUIT, AND IMAGING METHOD

BACKGROUND

1. Technical Field

The present application relates to an imaging apparatus which is capable of measuring the distance to an object, an imaging method, and a semiconductor integrated circuit.

2. Description of the Related Art

Known methods for measuring the distances to a plurality of objects included in a scene to be captured (hereinafter, "image capturing scene") include an active method and a passive method. The active method includes calculating the distance based on the time counted till a reflection wave of emitted infrared, ultrasonic wave, or laser light returns, calculating the distance based on the analysis of pattern light at the time of laser irradiation, etc. Such methods are in general capable of detecting the distance with high accuracy.

According to the passive method, the distance is calculated based on image information of an imaged object. In recent years, the resolution of image sensors is remarkably improving so that, in general, the distance can be calculated with high spatial resolution so long as the computational complexity can be dealt with. Also, high speed imaging of an object enables calculation of the distance with high temporal resolution. Further, in an imaging apparatus, such as a camera, the distance to an object can be measured inexpensively, without adding any direct member for distance measurement, as compared with the active method.

One of known passive methods is Depth from Defocus (hereinafter, referred to as "DFD") in which the distance is measured based on a blur of an image which is caused by variation of the focus (focusing position). According to this method, the distance can be measured from a small number of images, without requiring a plurality of cameras as explained, for example, following documents:

Patent Document 1: Japanese PCT National Phase Laid-Open Publication No. 2009-505104;
Non-patent Document 1: A. Pentland, "A New Sense for Depth of Field", IEEE Trans. Pattern Analysis and Machine Intelligence 9 (4) 1987 523-531; and
Non-patent Document 2: M. Subbarao, "Parallel Depth Recovery by Changing Camera Parameters", 2nd International Conference on Computer Vision, (1988).

SUMMARY

However, the active method in distance measurement, in general, cannot instantly measure the distances to a plurality of objects with high spatial resolution. Further, the active method is not suitable to power-limited mobile applications. In the case of an infrared system, some applications are restricted in their outdoor use in the sunlight.

The passive methods can solve the above problems but has another problem which is common among the passive methods: the distance measurement accuracy is affected by noise because image information of an imaged object is used. Particularly in the case of Depth from Defocus, a portion which has a large blur also has a large noise amount relative to the luminance value of an imaged object (i.e., the S/N deteriorates), and therefore, the range in which the distance can be measured with high accuracy has a limit.

A nonlimiting exemplary embodiment of the present application provides an imaging apparatus which is capable of distance measurement with high accuracy within an expanded range, a semiconductor integrated circuit, and an imaging method.

An imaging apparatus which is one embodiment of the present invention includes: an imaging device which has an imaging plane and which is configured to generate an image signal from light that is incident on the imaging plane; a lens optical system including a focus lens for condensing light toward the imaging device; a driving section configured to driving one of the imaging device and the focus lens so as to change a position to which a focus is adjusted on an object side; a shutter provided at at least one of the imaging device or a position between the lens optical system and the imaging device; and a control unit configured to control the shutter and the driving section, wherein the control unit drives the imaging device or the focus lens such that a focus is adjusted to each of first, second and third focusing positions of different object distances and controls the shutter and the driving section such that image signals of first, second and third object images at the first, second and third focusing positions are obtained by the imaging device.

According to an imaging apparatus and imaging method disclosed in the present application, the first object image and the second and third object images to which the focus is adjusted on the anterior side and the posterior side of the focusing position of the first object image are obtained, and distance measurement is carried out using the three images. The S/N improving effect can be expected over a wider range, and distance measurement can be carried out with high accuracy, as compared with a conventional case where two images are used. Further, when the first object image is used for viewing, the distances to objects that are present anterior or posterior to an object to which the focus is adjusted in the first object image can be measured.

These general and specific aspects may be implemented using a system, a method, and a computer program, and any combination of systems, methods, and computer programs.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

DETAILED DESCRIPTION

Figure 1:
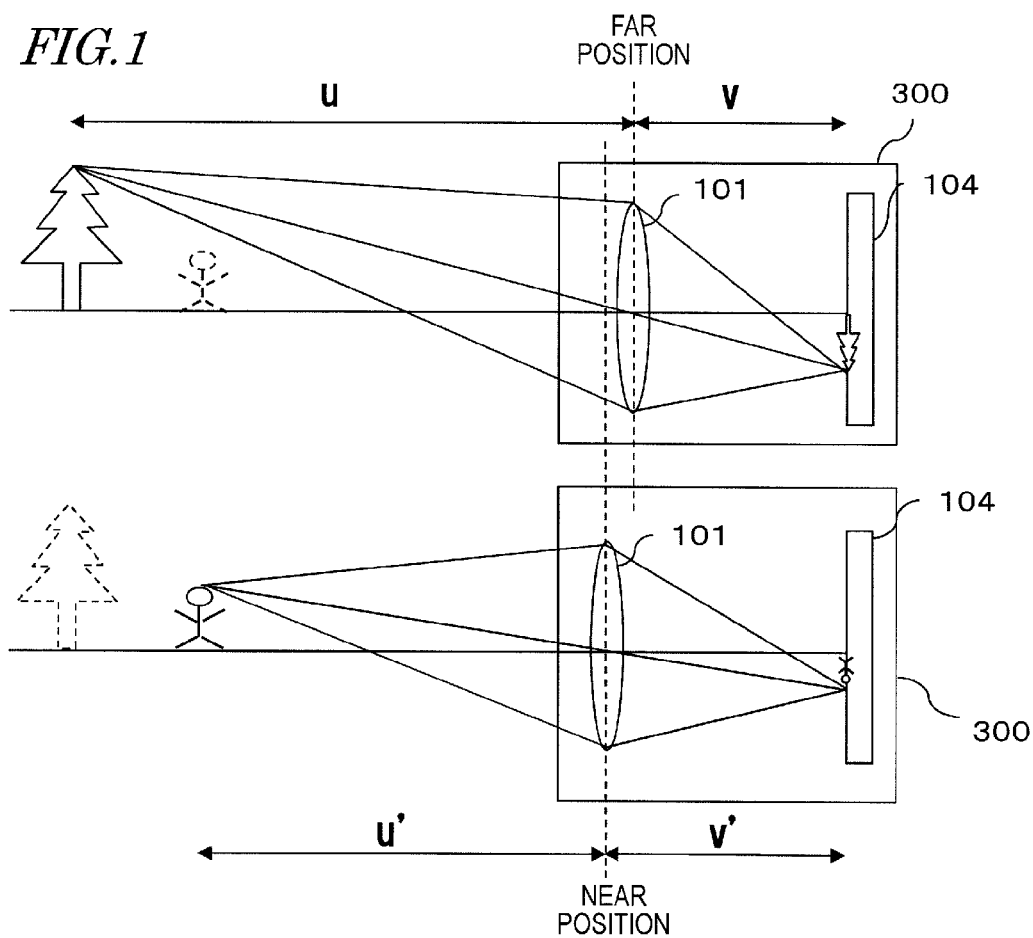
FIG. 1 is a diagram showing the positional relationship of objects, a focus lens, and an imaging device.

Firstly, the positional relationship between the focusing position in an image capturing scene and a focus lens and an imaging device is described. FIG. 1 is a schematic diagram showing the positional relationship between objects included in the image capturing scene and a focus lens 101 and an imaging device 104 in an imaging apparatus 300. In the case where the focus is adjusted to a position near the imaging apparatus 300 in an image capturing scene, the object distance u, from an object to which the focus is adjusted on the imaging plane to the focus lens 101 of the imaging apparatus 300, is relatively short, while the distance v between the focus lens 101 and the imaging device 104 is relatively long. In the case where the focus is adjusted to one of the objects included in the image capturing scene which is distant from the imaging apparatus 300, the object distance u from the object to which the focus is adjusted on the imaging plane to the focus lens 101 of the imaging apparatus 300 is relatively long, while the distance v between the focus lens 101 and the imaging device is the shortest. Note that, in FIG. 14, for the sake of easy illustration of the drawing, the distance between the focus lens 101 and the imaging device 104 is shown large as compared with the distance between the object and the imaging apparatus 300.

In the specification of the present application, the position of one of a plurality of objects included in the image capturing scene to which the focus is adjusted, or the position of part of that object, is referred to as "focusing position". The position of the focus lens 101 which is taken in that case is referred to as "driving position". In the case of driving the imaging device for focusing, the position of the imaging device 104 which is taken in that case is referred to as "driving position".

Figure 2:
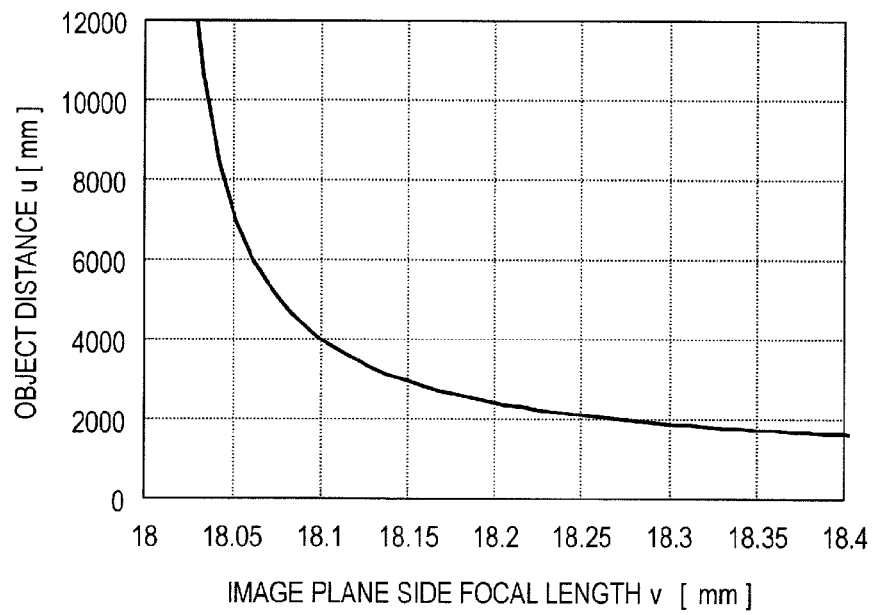
FIG. 2 is a graph showing an example of the relationship between the object distance u and the image plane side focal length v.

In this way, to which position in the image capturing scene the focus is adjusted depends on the distance between the focus lens 101 and the imaging plane of the imaging device 104. In general, according to the lens formula, the following relationship holds true:

$$1/f = 1/u + 1/v \quad \text{(Formula 1)}$$

where u is the distance between the object and the focus lens 101, v is the distance between the focus lens 101 and the imaging device 104, and f is the focal length of the focus lens 101. In the case where the lens optical system used for photographing includes a plurality of focus lenses, the object distances u, v are considered at the position of the lens principal point. As an example, the relationship between u and v for the case where f is 18 [mm] is shown in FIG. 2. As the position of the focus lens 101 changes, the distance v between the lens principal point and the imaging device varies. As seen from FIG. 2, as the distance v on the image plane side increases, the object distance u on the object side decreases. Also, as seen from Formula 1, the object distance u and the distance v are not in a proportional relationship or in an inverse proportional relationship.

The distance v may be varied by moving the imaging device 104, although in FIG. 1 the distance v is varied by changing the position of the focus lens 101. In the specification of the present application, the above-described relationship is utilized to describe the focus position in the image capturing scene based on the position of the focus lens. The near position refers to a position of the focus lens in the case where the focal point is on (i.e., the optical system is focused on) an object in the image capturing scene which is positioned on the side that is relatively close to the imaging apparatus or focus lens. The far position refers to a position of the focus lens in the case where the focal point is on (i.e., the optical system is focused on) an object in the image capturing scene which is positioned on the side that is relatively distant from the imaging apparatus or focus lens.

Figure 3:
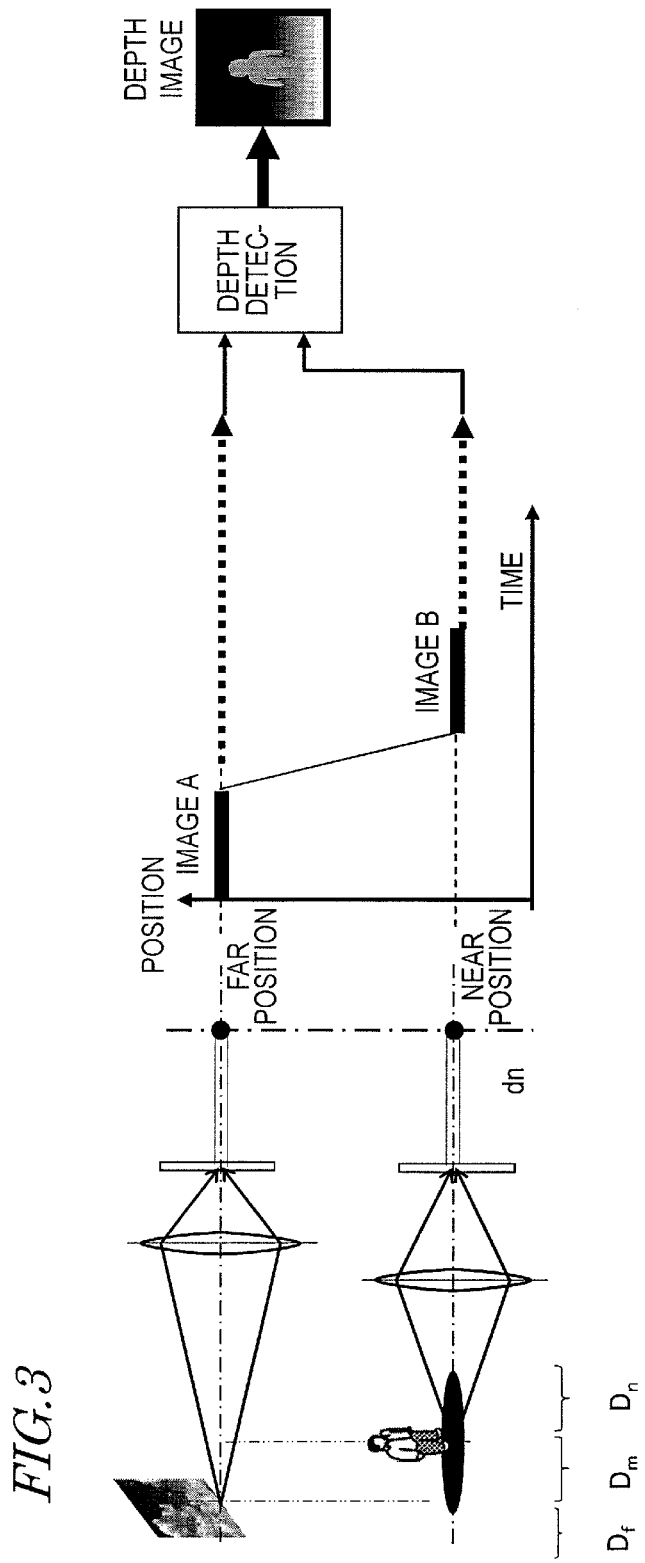
FIG. 3 is a schematic diagram illustrating a method for distance measurement according to a conventional DFD method.

Next, a problem in distance measurement which is carried out according to a conventional DFD method is described. FIG. 3 schematically illustrates a method for measuring the distance according to the conventional DFD method. The horizontal axis represents time, and the vertical axis represents the relative position of the focus lens. As shown in FIG. 3, according to the conventional DFD method, by placing the focus lens on the far position side, an image A is obtained in which the focus is adjusted to an object in the image capturing scene which is relatively distant from the imaging apparatus. By placing the focus lens on the near position side, an image B is obtained in which the focus is adjusted to an object in the image capturing scene which is relatively close to the imaging apparatus.

By applying the images A, B to the operation methods disclosed in Non-patent Documents 1 and 2, a depth image is obtained in which the distance at an arbitrary pixel position in a photographing image (the depth of an object) is determined.

However, the DFD method determines the distance from the degree of the blur of the image and therefore requires that the object is appropriately blurred in the images A, B. When the difference in blur between the images A, B is extremely small (i.e., when the focusing positions of the images A, B are excessively close to each other), or when the difference in blur between the images A, B is excessively large (i.e., when the focusing positions of the images A, B are excessively distant from each other), the distance to the object cannot be accurately measured in some cases, and the range in which the distance can be measured may be narrowed in other cases. Further, in principle, in FIG. 3, when the images A, B are at the far position and the near position, the distance can be accurately measured within the range $D_m$. On the other hand, in the other ranges $D_n$, and $D_f$, the distance measurement accuracy is relatively high in a portion of the ranges $D_n$ and $D_f$ which is close to the range $D_m$, while the distance measurement accuracy relatively deteriorates in a portion of the ranges $D_n$ and $D_f$ which is more distant from the range $D_m$.

That is, for example, accurately measuring the distance to an object which is at a position somewhat more distant than an object in focus in the image A and accurately measuring the distance to an object which is at a position somewhat closer than an object in focus in the image B are difficult. This means that, for example, in the case where either of the image A or the image B is used as an image to be viewed by a user (hereinafter, "view image"), the balance is disturbed between the anterior and posterior regions of the range in which the distance to an object can be correctly measured.

In view of the above problems, the inventors of the present application conceived a novel imaging apparatus, semiconductor integrated circuit, and imaging method. The summary of an embodiment of the present invention is as described below.

An imaging apparatus which is an embodiment of the present invention includes: an imaging device which has an imaging plane and which is configured to generate an image signal from light that is incident on the imaging plane; a lens optical system including a focus lens for condensing light toward the imaging device; a driving section configured to driving one of the imaging device and the focus lens so as to change a position to which a focus is adjusted on an object side; a shutter provided at at least one of the imaging device or a position between the lens optical system and the imaging device; and a control unit configured to control the shutter and the driving section, wherein the control unit drives the imaging device or the focus lens such that a focus is adjusted to each of first, second and third focusing positions of different object distances and controls the shutter and the driving section such that image signals of first, second and third object images at the first, second and third focusing positions are obtained by the imaging device.

The control unit may control the shutter and the driving section such that the imaging device produces any of the first object image, the second object image, or the third object image in every image frame of the imaging device.

The control unit may control opening and closing of the shutter such that the first object image, the second object image, or the third object image is obtained in a portion of each image frame, and the control unit may control the driving section such that a focusing position changes between the first focusing position and the second focusing position or between the second focusing position and the third focusing position in another portion of the each image frame.

The first focusing position is present between the second focusing position and the third focusing position, and the control unit may control the shutter and the driving section such that the first object image is photographed in every other frame, and the second object image and the third object image are alternately photographed in every other frame.

When the focus lens is focused on the first, second and third focusing positions, the driven imaging device or focus lens is at the first, second and third driving positions, respectively, and the control unit may determine the second and third driving positions such that the distance between the first driving position and the second driving position and the distance between the first driving position and the third driving position are equal to each other.

When the focus lens is focused on the first and third focusing positions, the driven imaging device or focus lens is at the first and third driving positions, respectively, when the focus lens is focused at a minimum focus distance, the driven imaging device or focus lens is at a fourth driving position, and when the distance between the first driving position and the fourth driving position is shorter than the distance between the first driving position and the third driving position, the control unit may control the driving section such that the driven imaging device or focus lens is moved to the fourth driving position, and an image signal of the second object image is obtained by the imaging device.

When the focus lens is focused on the first and second focusing positions, the driven imaging device or focus lens is at the first and second driving positions, respectively, and when the focus lens is focused on an infinity, the driven imaging device or focus lens is at the fifth driving position, and when the distance between the first driving position and the fifth driving position is shorter than the distance between the first driving position and the second driving position, the control unit controls the driving section such that the driven imaging device or focus lens is moved to the fifth driving position, and an image signal of the third object image is obtained by the imaging device.

When the focus lens is focused on the first, second and third focusing positions, the driven imaging device or focus lens is at the first, second and third driving positions, respectively, and the control unit may determine the second and third driving positions based on an instruction from a user such that the distance between the first driving position and the second driving position and the distance between the first driving position and the third driving position are in a ratio between 1:1 to 8:2 or between 1:1 to 2:8.

The imaging apparatus may further include a signal processing section which is configured to generate a signal of a movie image which is formed by the first object image photographed in every other frame and generate a signal of distance information in the first object image photographed in every other frame based on the first, second and third object images.

The control unit may set the second and third focusing positions according to a variation in the first focusing position which is based on an instruction from a user or an autofocus function.

A semiconductor integrated circuit which is an embodiment of the present invention is a semiconductor integrated circuit of an imaging apparatus including an imaging device which has an imaging plane and which is configured to generate an image signal from light that is incident on the imaging plane, a lens optical system including a focus lens for condensing light toward the imaging device, a driving section configured to driving one of the imaging device and the focus lens so as to change a position to which a focus is adjusted on an object side, and a shutter provided at at least one of the imaging device or a position between the lens optical system and the imaging device, wherein the semiconductor integrated circuit drives the imaging device or the focus lens such that a focus is adjusted to each of first, second and third focusing positions of different object distances, and the semiconductor integrated circuit controls the shutter and the driving section such that image signals of first, second and third object images at the first, second and third focusing positions are obtained by the imaging device.

The semiconductor integrated circuit controls opening and closing of the shutter such that the first object image, the second object image, or the third object image is obtained in a portion of each image frame, and the semiconductor integrated circuit may control the driving section such that a focusing position changes between the first focusing position and the second focusing position or between the second focusing position and the third focusing position in another portion of the each image frame.

The first focusing position is present between the second focusing position and the third focusing position, and the semiconductor integrated circuit may control the shutter and the driving section such that the first object image is photographed in every other frame, and the second object image and the third object image are alternately photographed in every other frame.

When the focus lens is focused on the first, second and third focusing positions, the driven imaging device or focus lens is at the first, second and third driving positions, respectively, and the semiconductor integrated circuit may determine the second and third driving positions such that the distance between the first driving position and the second driving position and the distance between the first driving position and the third driving position are equal to each other.

An imaging method which is an embodiment of the present invention is an imaging method including forming an image of an image capturing scene by exposing an imaging plane of an imaging device, which is configured to generate an image signal from incident light, to light incoming through a lens optical system which includes a focus lens at a timing of a shutter which is provided at at least one of the imaging device or a position between the lens optical system and the imaging device, wherein the imaging device or the focus lens is driven such that a focus is adjusted to each of first, second and third focusing positions of different object distances, and one of the imaging device and the focus lens is driven such that image signals of first, second and third object images at the first, second and third focusing positions are obtained by the imaging device.

The shutter may be controlled, and one of the imaging device and the focus lens may be driven, such that the imaging device produces any of the first object image, the second object image, or the third object image in every image frame of the imaging device.

Opening and closing of the shutter may be controlled such that the first object image, the second object image, or the third object image is obtained in a portion of each image frame, and one of the imaging device and the focus lens may be driven such that a focusing position changes between the first focusing position and the second focusing position or between the second focusing position and the third focusing position in another portion of the each image frame.

The first focusing position is present between the second focusing position and the third focusing position, and the shutter may be controlled, and one of the imaging device and the focus lens may be driven, such that the first object image is photographed in every other frame, and the second object image and the third object image are alternately photographed in every other frame.

When the focus lens is focused on the first, second and third focusing positions, the driven imaging device or focus lens is at the first, second and third driving positions, respectively, and the second and third driving positions may be determined such that the distance between the first driving position and the second driving position and the distance between the first driving position and the third driving position are equal to each other.

Hereinafter, embodiments of an imaging apparatus, semiconductor integrated circuit, and imaging method of the present invention are described with reference to the drawings.

Figure 4:
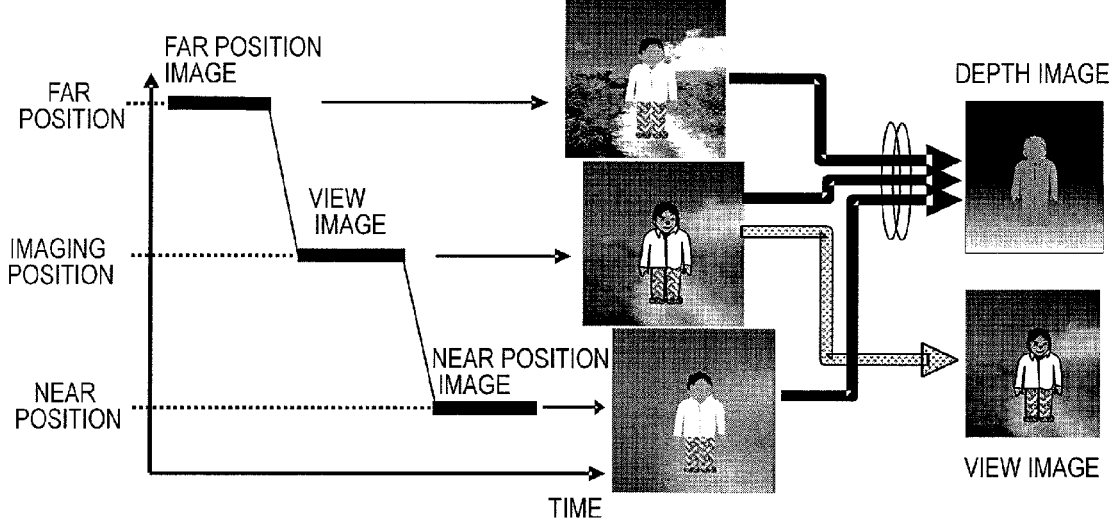
FIG. 4 is a schematic diagram illustrating a method for obtaining an image by an imaging apparatus and imaging method of an embodiment.

FIG. 4 is a schematic diagram for illustrating an embodiment of an imaging method of the present invention. The imaging method of the present embodiment first obtains three images which have different focusing positions in the image capturing scene. Specifically, a view image which is focused on an object at a position intended by a user in the image capturing scene (first object image), a near position image which is focused on a position which is closer to the imaging apparatus than the focusing position in the view image (second object image), and a far position image which is focused on a position which is more distant from the imaging apparatus than the focusing position in the view image (third object image) are automatically obtained. These three images are used to obtain a depth image, in which the distance at an arbitrary pixel position in the view image (the depth of the object) is determined, by an operation which is carried out according to the DFD method. Further, the view image is used as a still image or a movie image.

According to the above method, the view image and the images which are focused at the near position side and the far position side relative to the focusing position in the view image are used in calculation of the distance according to the DFD method, and therefore, the range of the distance measurement can be broader than the conventional one. Further, the distances to objects which are present at the near position side and the far position side relative to the focusing position in the view image can also be measured.

Figure 5:
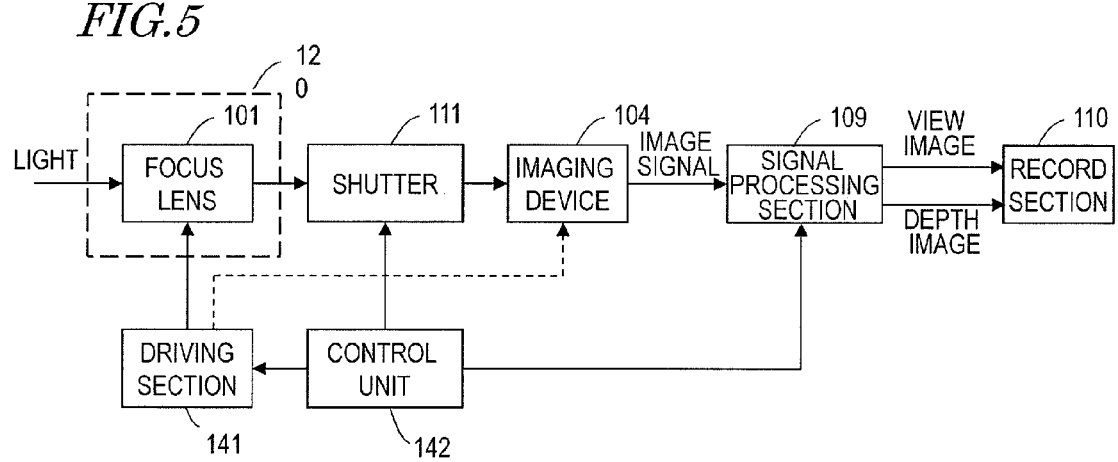
FIG. 5 is a block diagram showing an imaging apparatus of an embodiment.

FIG. 5 is a block diagram showing a configuration example of the imaging apparatus of the present embodiment. The imaging apparatus of the present embodiment includes an imaging device 104, a lens optical system 120, a driving section 141, a shutter 111, a control unit 142, a signal processing section 109, and a record section 110.

The imaging device 104 has an imaging plane and is configured to generate an image signal from light which is incident on the imaging plane. The lens optical system 120 includes a focus lens 101 and condenses light from the image capturing scene that includes an object toward the imaging plane of the imaging device 104. The driving section 141 drives one of the imaging device 104 or the focus lens 101 such that the distance between the imaging plane of the imaging device 104 and the focus lens 101 varies. The driving section 141 may drive the imaging device 104, although FIG. 5 shows that the focus lens 101 is driven.

The shutter 111 is provided at at least one of a position between the lens optical system 120 and the imaging device 104 or the imaging device. In FIG. 5, the shutter 111 is provided in the optical path between the lens optical system 120 and the imaging device 104 and is configured to control the timing of light for irradiating the imaging plane of the imaging device 104, i.e., the timing of exposure. In addition to, or instead of, the shutter 111, an electronic shutter may be provided to the imaging device 104. The electronic shutter is configured to control an electric signal generated from light detected in the imaging device and accumulation of electric charges.

The control unit 142 controls the driving section 141 and the shutter 111. As previously described with reference to FIG. 4, in the present embodiment, a view image, a far position image, and a near position image are automatically photographed. To this end, the driving section 141 drives the focus lens 101 based on the control by the control unit 142 such that the driving section 141 drives the focus lens, and as described above, the focus is adjusted to a position intended by a user in the image capturing scene, a position which is closer to the imaging apparatus than the position intended by the user, and a position which is more distant from the imaging apparatus than the position intended by the user. Also, the control unit controls the shutter 111 such that photographing can be carried out at the focusing position under appropriate exposure conditions. As illustrated in FIG. 4, the focus lens is controlled such that its position is not changed, i.e., kept at the same position, during the exposure. In this way, a view image, a far position image, and a near position image, in which the focus is adjusted to a position intended by a user in the image capturing scene, a position which is closer to the imaging apparatus than the intended position, and a position which is more distant from the imaging apparatus than the intended position, are formed in the imaging plane of the imaging device 104. The imaging device 104 detects the formed images at different timings to generate image signals. The photographing is performed using a single lens optical system 120, and therefore, these three image signals are not concurrently generated but sequentially generated.

The signal processing section 109 carries out an operation according to the DFD method based on the view image, the far position image, and the near position image which are obtained from the imaging device 104, thereby producing a depth image. The depth image and the view image are recorded in the record section 110.

Although the imaging apparatus shown in FIG. 5 includes the signal processing section 109 and the record section 110, the imaging apparatus may not include the signal processing section 109 and the record section 110. Instead, an external signal processing unit may carry out the above-described operation and store generated image signals.

The imaging apparatus of the present embodiment includes the above-described configuration and therefore can have a broader distance measurement range than a conventional one and can also measure the distances to objects which are present at the near position side and the far position side relative to the focusing position in the view image. Further, with such a configuration, a movie image can be suitably photographed. Hereinafter, an example of an imaging method and an operation of a photograph apparatus for photographing a movie image is described.

Figure 6:
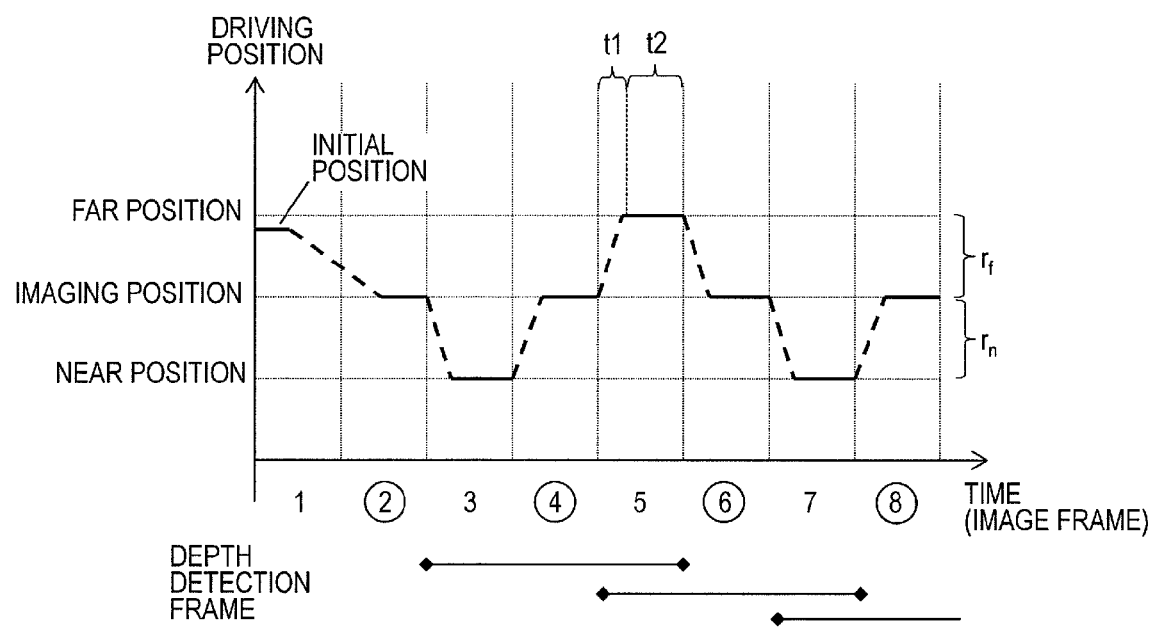
FIG. 6 is a diagram showing driving positions of a focus lens in an imaging apparatus and imaging method of an embodiment.

FIG. 6 schematically shows the timing of driving the focus lens and the timing of photographing an image in the imaging method and an operation of the photograph apparatus of the present embodiment. In FIG. 6, the horizontal axis represents time in a photograph frame representation, and the vertical axis represents the relative position of the focus lens (driving position). The frame of the horizontal axis may be a frame rate which can be realized by the imaging apparatus. For example, one frame is 1/30 seconds. In the case of a photograph apparatus which is capable of high speed photographing, it may operate with a frame shorter than 1/30 seconds.

In the vertical axis of FIG. 6, the imaging position (first driving position) is the position of the focus lens which is focused on a position of an object intended by a user in the image capturing scene, and the near position (second driving position) and the far position (third driving position) are the positions of the focus lens which is focused on a position which is closer to the imaging apparatus, and a position which is more distant from the imaging apparatus, than the imaging position in the image capturing scene.

As will be described below in detail, when the distance $r_f$ between the imaging position and the far position and the distance $r_n$ between the imaging position and the near position are equal to each other, the distance can be accurately measured. The distance $r_f$ between the imaging position and the far position and the distance $r_n$ between the imaging position and the near position are determined based on the focal length of the focus lens 101, the aperture of the lens optical system 120, the pixel pitch size of the imaging device 104, etc.

As shown in FIG. 6, when photographing of a movie image is started, firstly, for example, in the first frame, the focus lens 101 is moved from the initial position to the imaging position which is a focusing position of an object to be photographed. This operation accords with common autofocus driving. When the driving capacity of the driving section 141 is insufficient for moving the focus lens 101 from the initial position to the imaging position within one frame, a portion of the second frame may be used for moving the focus lens 101.

After the focus lens 101 is moved to the imaging position, the shutter 111 is controlled to start photographing. Here, the shutter is not limited to any particular type. It may be an electronic shutter or may be a mechanical shutter. During photographing of the first image frame, the focus lens 101 does not move in principal, i.e., stays at the imaging position. Note that, however, for convenience of the autofocus operation or the like, the focus lens 101 may take a wobbling action such that the focus lens changes its position relative to the imaging device to such an extent that a blur of the image cannot be sensed by a human eye.

Photographing at the imaging position is performed in a portion of one frame period, and as a result, a signal of the view image is generated.

After the photographing at the imaging position is finished, the focus lens 101 is moved to the near position. This is carried out in a portion of the third frame. Thereafter, in the remaining portion of the third frame, the shutter 111 is controlled to start photographing. During photographing, the focus lens 101 does not move, i.e., stays at the near position. As a result, a signal of the near position image is generated.

After the photographing at the near position is finished, the focus lens 101 is moved to the imaging position in a portion of the fourth frame. In the remaining portion of the fourth frame, the shutter 111 is controlled to start photographing. As a result, a signal of the view image is generated.

After the photographing at the imaging position is finished, the focus lens 101 is moved to the far position in a portion of the fifth frame. In the remaining portion of the fifth frame, the shutter 111 is controlled to perform photographing, and as a result, a signal of the far position image is generated.

Thereafter, the above operation is repeated, whereby signals of the view image are continuously generated, and a movie image can be photographed.

As shown in FIG. 6, in a portion t1 of each frame, the focus lens 101 is driven, and in the remaining portion t2, an object is photographed. As a result, in every photograph frame, a signal of any of the view image, the far position image, and the near position image is generated by the imaging device.

In FIG. 6, encircled frames indicate that the view image is produced. As shown, the view image is produced in every other frame, and the far position image and the near position image are alternately produced in every other frame. Thus, according to the present embodiment, the view image can be produced at ½ of the frame rate of the imaging device.

In the case where the view image, the far position image, and the near position image are produced as described above, in a frame immediately precedent to the frame where the view image is produced, one of the far position image and the near position image is produced, while in an immediately succeeding frame, the other of the far position image and the near position image is produced. Therefore, distance measurement can be carried out by using each view image and the far position image and the near position image which are produced in its immediately precedent and succeeding frames, and distance measurement can be carried out on each view image.

Therefore, according to the present embodiment, a movie image including view images which are produced at the rate of ½ of the frame rate of the imaging device can be obtained. Further, in each view image, the distance to an object which is anterior or posterior to an object to which the focus is adjusted can also be measured.

Hereinafter, more specific embodiments of the imaging apparatus, semiconductor integrated circuit, and imaging method of the present invention are described.

Figure 7:
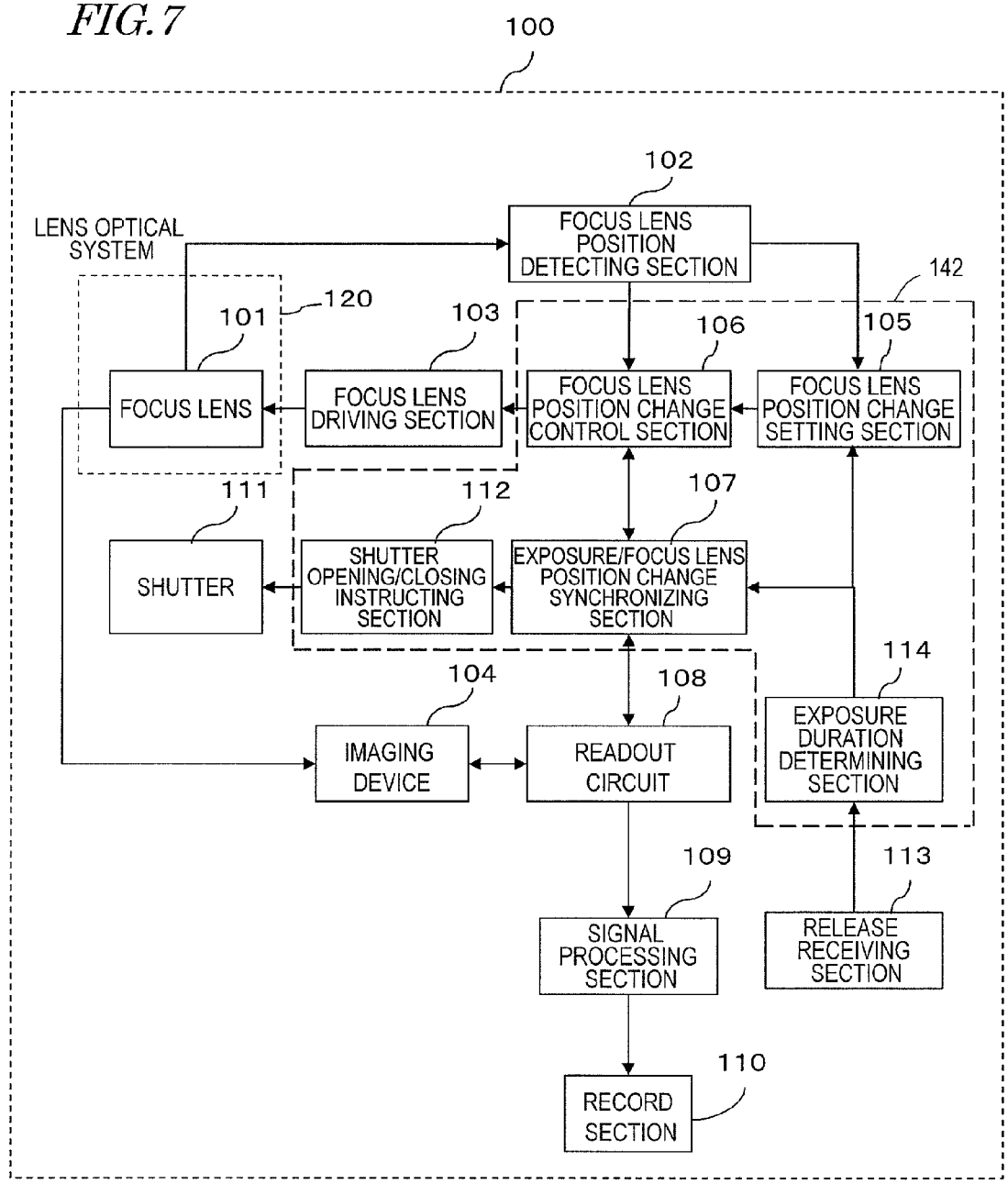
FIG. 7 is a more detailed block diagram showing an imaging apparatus of an embodiment.

FIG. 7 is a block diagram showing a more specific configuration of the imaging apparatus of the present embodiment. The imaging apparatus 100 includes a focus lens driving section 103, an imaging device 104, a focus lens position change control section 106, an exposure/focus lens position change synchronizing section 107, and a lens optical system 120.

The imaging device 104 may be a CCD image sensor or may be a CMOS image sensor. The imaging device 104 includes a plurality of photoelectric conversion elements which are in a two-dimensional arrangement and which form an imaging plane. After light is introduced to be incident on the plurality of photoelectric conversion elements for exposure, electric signals are read out from the plurality of photoelectric conversion elements, and an image signal is generated.

The lens optical system 120 includes a focus lens 101 which is configured to condense light toward the imaging device 104 and focus the image capturing scene on the imaging plane of the imaging device 104. To adjust the focus to a desired object in the image capturing scene, the lens optical system 120 may include one or more lenses other than the focus lens 101. The focus lens 101 may also be formed by a plurality of lenses. When the focus lens 101 is formed by a plurality of lenses, the position of the focus lens refers to the position of the principal point which is realized by the plurality of lenses.

In the present embodiment, the focus lens driving section 103 functions as a driving section configured to driving one of the imaging device 104 or the focus lens 101 such that the distance between the imaging device 104 and the focus lens 101 changes. That is, the focus lens driving section 103 drives the focus lens 101 based on a driving signal such that the distance between the imaging device 104 and the focus lens 101 changes.

As will be described below, the focus lens position change control section 106 is configured to output an instruction to the focus lens driving section 103 such that the focus lens 101 moves at a predetermined timing.

The exposure/focus lens position change synchronizing section 107 is configured to control the focus lens position change control section 106 based on the timing of exposure of the imaging device 104.

The imaging apparatus 100 further includes a focus lens position detecting section 102, a focus lens position change setting section 105, a readout circuit 108, a signal processing section 109, a record section 110, a shutter 111, a shutter opening/closing instructing section 112, a release receiving section 113, and an exposure duration determining section 114.

The focus lens position detecting section 102 includes a position sensor for detecting the position of the focus lens 101 and outputs a detection signal to the focus lens position change control section 106 and the focus lens position change setting section 105. The focus lens position change setting section 105 determines the imaging position based on the detection signal from the focus lens position detecting section 102, and determines the near position and the far position, to which the focus lens is to be moved, based on the imaging position, the focal length, the aperture, the pixel pitch of the imaging device 104, etc. The imaging position, the near position, and the far position are selected as positions of a target focus lens. Then, the focus lens position change control section 106 calculates the driving signal from the difference between the position of the target focus lens and the current position of the focus lens 101 which is detected by the focus lens position detecting section 102 and outputs the calculated driving signal to the focus lens driving section 103.

When the release receiving section 113 receives an exposure start instruction from a user, the exposure duration determining section 114 determines the exposure duration of the imaging device 104. Also, the exposure duration determining section 114 outputs information about the exposure duration to the exposure/focus lens position change synchronizing section 107 and the focus lens position change setting section 105.

The exposure/focus lens position change synchronizing section 107 outputs instructions, based on the information about the exposure duration, to the shutter opening/closing instructing section 112, the focus lens position change control section 106, and the readout circuit 108 such that exposure, driving of the focus lens 101, and reading of electric signals from the imaging device 104 are carried out at a synchronized timing. Specifically, the synchronizing section 107 gives the shutter opening/closing instructing section 112 instructions about the timing of exposure and the exposure duration. Meanwhile, the synchronizing section 107 gives the focus lens position change control section 106 instructions about the timing of driving the focus lens 101 and the driving duration.

The shutter 111 performs an opening/closing operation according to an instruction from the shutter opening/closing instructing section 112. When the shutter 111 is open, the imaging device 104 is exposed to light condensed by the focus lens 101, the light to which the imaging device 104 is exposed is converted to an electric signal, and the electric signal is output.

The readout circuit 108 outputs a readout signal to the imaging device 104 in order to read out electric signals, and outputs the read electric signals to the signal processing section 109.

The signal processing section 109 makes various corrections to the input electric signals and generates an image signal of the view image, the far position image, or the near position image in every frame. Further, as will be described below, the signal processing section 109 produces a depth image from the view image, the far position image, and the near position image.

Thus, the imaging apparatus 100 can produce a movie image which is formed by the view images and produce a depth image corresponding to each of the view images.

Of the above-described constituents of the imaging apparatus 100, the focus lens position detecting section 102, the focus lens driving section 103, the imaging device 104, the signal processing section 109, the release receiving section 113, and the record section 110 may be realized by known hardware. Part or all of the respective constituents of the focus lens position change setting section 105, the focus lens position change control section 106, the exposure/focus lens position change synchronizing section 107, the readout circuit 108, the signal processing section 109, the record section 110, the shutter opening/closing instructing section 112, and the exposure duration determining section 114 may be realized by a data processing circuit, such as a CPU, and software stored in a storage section, such as a memory. In this case, the data processing circuit retrieves from the memory the software that defines the procedure of an imaging method which will be described below and performs the procedure of the imaging method, thereby controlling the respective constituents of the imaging apparatus 100. Part of the constituents which is realized by the data processing circuit and the software stored in the memory may be realized by a special-purpose integrated circuit. For example, the focus lens position change setting section 105, the focus lens position change control section 106, the exposure/focus lens position change synchronizing section 107, the shutter opening/closing instructing section 112, and the exposure duration determining section 114 may form a semiconductor integrated circuit.

Next, the imaging method of the present embodiment, particularly driving of the focus lens 101 and the timing of photographing by the imaging device, is described with reference to FIG. 7 and FIG. 8.

Figure 8:
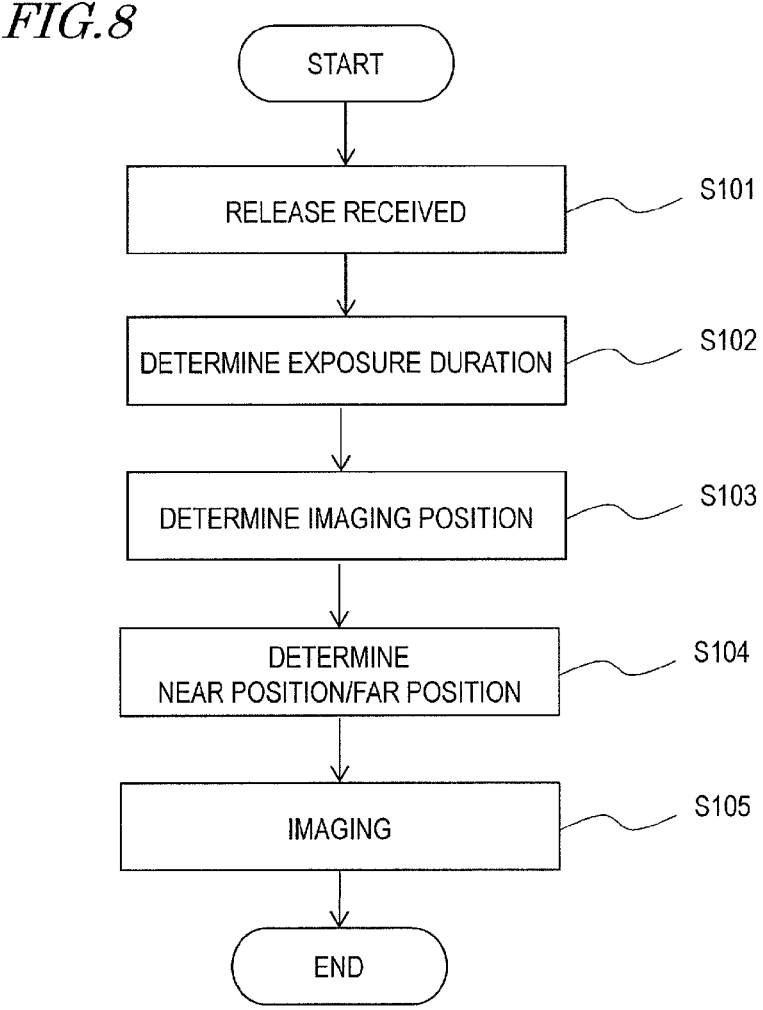
FIG. 8 is a flowchart illustrating a procedure of photographing by an imaging apparatus and imaging method of an embodiment.

FIG. 8 is a flowchart illustrating the imaging method of the present embodiment. Firstly, when a release action by a user is received (S101), the exposure duration determining section 114 determines the exposure duration (or information about the exposure duration) from the f-number and the brightness of an image capturing scene (S102). The exposure duration is output to the focus lens position change setting section 105 and the exposure/focus lens position change synchronizing section 107.

Then, the focus lens position change setting section 105 determines the imaging position from the detection signal output from the focus lens position detecting section 102 (S103), and determines the near position and the far position based on the imaging position, the focal length of the focus lens, the aperture, the pixel pitch of the imaging device 104, etc. (S104). Alternatively, the near position and the far position may be determined by adding and subtracting a predetermined distance to and from the imaging position. The imaging position may be a position of the focus lens corresponding to the position at which the release is received or may be the imaging position which is reached when a user moves the focus lens 101 to be focused on an object intended by the user. Alternatively, the imaging position may be a position of the focus lens 101 which is reached when the focus is adjusted by an autofocus function to a position in a photographing screen which is intended by a user.

After determination of the near position and the far position, the exposure/focus lens position change synchronizing section 107 gives instructions to the shutter opening/closing instructing section 112, the focus lens position change setting section 105, and the readout circuit 108 such that the focus lens position change setting section 105 and the readout circuit 108 operate based on the timing of the image frame of the imaging device 104. As a result, the focus lens 101 moves from the imaging position to the far position (or the near position), the imaging position, and the near position (or the far position) in this order. The focus lens 101 stops at the reached positions, and thereafter, the shutter opening/closing instructing section 112 opens the shutter 111 to start exposure of the imaging device 104, and photographing is performed, i.e., the view image, the far position image, and the near position image are obtained (S105). Image signals generated by the photographing are output from the imaging device 104 to the readout circuit 108.

After the photographing is finished, the shutter 111 is closed to end the photographing. In the case of movie image photographing, the steps S102 to S105 are repeated till a record stop processing instruction from a user is input, whereby movie image photographing can be carried out.

Figure 9:
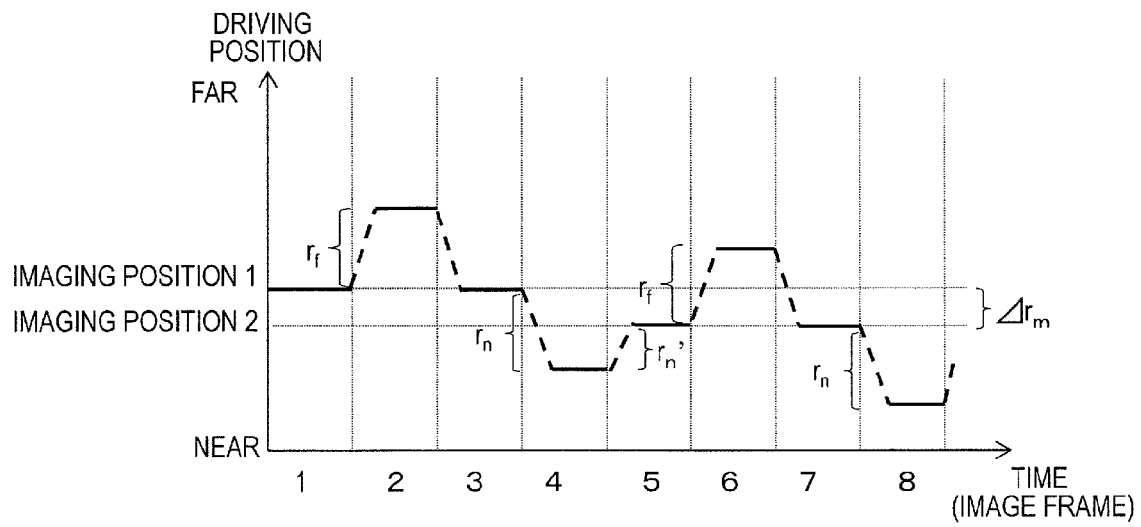
FIG. 9 is a diagram showing driving positions of a focus lens in an imaging apparatus and imaging method of an embodiment in the case where an object is moving.

In the case of photographing a movie image using the imaging apparatus of the present embodiment, when an object moves during photographing of the movie image, the imaging position may be moved by a user's focusing operation or an autofocus function so as to follow the movement of the object. In this case, every time the imaging position moves, the near position and the far position are recalculated (S104), and photographing is carried out at the far position and the near position in addition to photographing at the imaging position. FIG. 9 shows an example of the driving timing of the focus lens in the case where the imaging position changes during movie image photographing. In FIG. 9, an object which is at imaging position 1 before the time of image frame 1 is moved to be at imaging position 2 in image frame 3. It is assumed that imaging position 2 is closer to the near side than imaging position 1 by $\Delta r_m$. At the time of image frame 3, movement of the object to the near side by $\Delta r_m$ is proved from distance results calculated in image frames 2, 3 and 4. Therefore, in subsequent image frames 4, 5 and 6, photographing is carried out at the imaging position 2, which is followed by photographing at the far position and the near position. Specifically, in a period stretching from image frame 4 to image frame 5, it is moved to the far position side by $r_n - \Delta r_m$, so that the distance of the movement of the focus lens is $r_n'$. The distance of the movement of the focus lens which is caused when it is moved to the imaging position 2 after photographing at the near position is small.

Next, setting of the near position and the far position in the case where the imaging position is near the minimum focus distance and the case where the imaging position is near the infinity.

Figure 10:
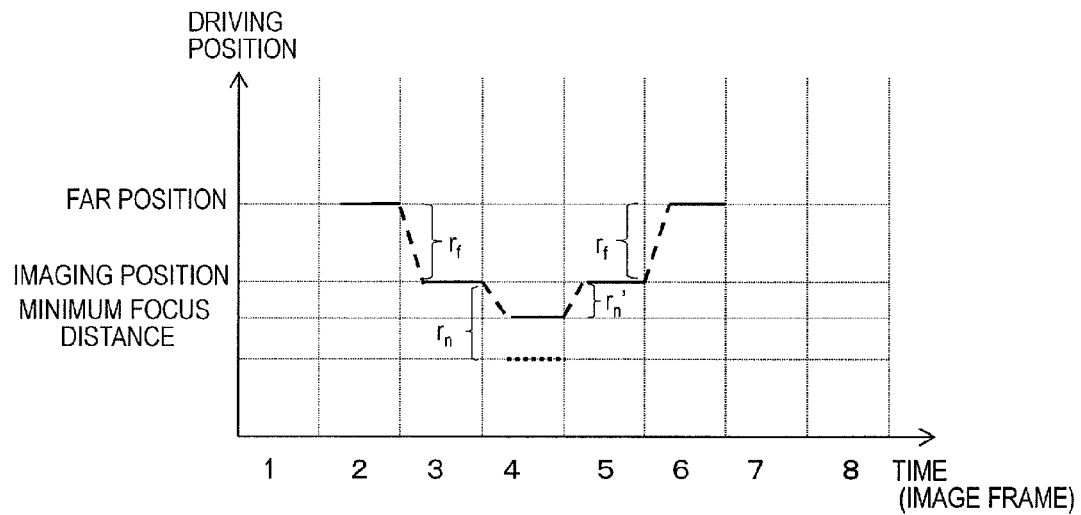
FIG. 10 is a diagram showing driving positions of a focus lens in an imaging apparatus and imaging method of an embodiment in the case where an object is near the minimum focus distance.

FIG. 10 shows setting positions of the far position and the near position in the case where the imaging position is near the minimum focus distance. As shown in FIG. 10, in the case where the imaging position is near the minimum focus distance, in trying to set the far position and the near position which are distant from the imaging position by equal distances $r_f$ and $r_n$, setting of the near position fails in some cases. That is, when the distance $r_n'$ between the imaging position and the minimum focus distance is smaller than the distance $r_f$ between the imaging position and the far position to be set, the near position cannot be set to a position which is distant from the imaging position by $r_n$ on the imaging apparatus side. In this case, the focus lens position change setting section 105 sets the near position to the minimum focus distance (fourth driving position) for photographing the near position image at the minimum focus distance.

Thus, the distance between the imaging position and the far position and the distance between the imaging position and the near position are not equal to each other, and the accuracy in distance measurement loses the balance between the anterior and posterior regions in some cases. However, the distance measurement range on the side that is more distant from the imaging apparatus than the imaging position would not be narrowed, and therefore, the distance to an object which is posterior to an object to which the focus is adjusted can be measured as in usual cases. Rather, an image photographed at the imaging position and an image photographed at the near position are close to each other, and accordingly, the resistance to noise improves and the distance measurement accuracy improves as compared with usual cases.

Figure 11:
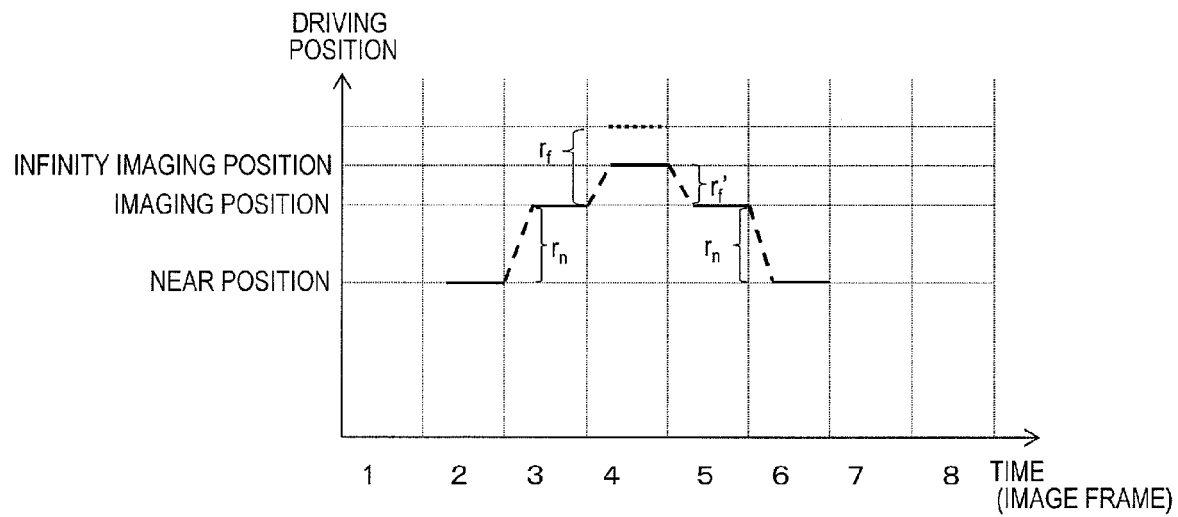
FIG. 11 is a diagram showing driving positions of a focus lens in an imaging apparatus and imaging method of an embodiment in the case where an object is near the infinity.

FIG. 11 shows setting positions of the far position and the near position in the case where the imaging position is near the infinity photographing position. As shown in FIG. 11, also in the case where the imaging position is near the infinity photographing position, in trying to set the far position and the near position which are distant from the imaging position by equal distances $r_f$ and $r_n$, setting of the far position fails in some cases. That is, when the distance $r_f'$ between the imaging position and the minimum focus distance is smaller than the distance $r_n$ between the imaging position and the near position to be set, the far position cannot be set to a position which is distant from the imaging position by $r_f$ on the imaging apparatus side. In this case, the focus lens position change setting section 105 sets the far position to the infinity photographing position (fifth driving position) for photographing the far position image at the infinity photographing position. In this case also, the distance measurement range on the side that is closer to the imaging apparatus than the photographing position would not be narrowed, and therefore, the distance to an object which is anterior to an object to which the focus is adjusted can be measured as in usual cases.

Figure 12:
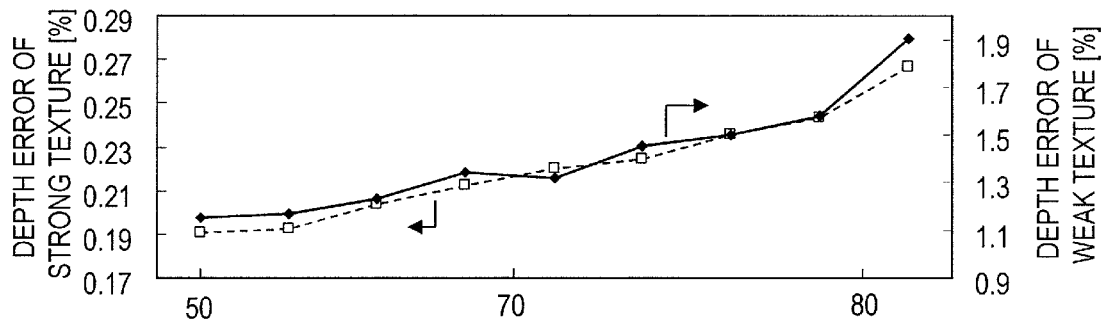
FIG. 12 is a graph showing the error in distance measurement in the case where the imaging position is shifted from the midpoint position between a near position and a far position.

Further, as described above, when the distance $r_n$ between the imaging position and the near position and the distance $r_f$ between the imaging position and the far position are equal to each other, distance measurement can be carried out over the widest range with excellent balance between the anterior and posterior regions. However, as previously described, when distance measurement over a wide range is not necessary, or when a range which is to undergo distance measurement is unevenly present, the imaging position may be set to a position which is deviated from the midpoint position between the far position and the near position. FIG. 12 shows the results of the simulation of determining the largeness of the distance measurement error in the case where the imaging position is shifted from the near position side to the far position side. The horizontal axis represents the imaging position on the assumption that the midpoint position between the near position and the far position corresponds to 50%. When the imaging position is shifted to either side, the value increases. Here, in consideration of the symmetry, the shown range is larger than 50%. The vertical axis on the left side represents the percentage of the distance measurement error (in the drawing, "depth error") in the case of a photographed image of an object which has a strong texture for distance measurement, such as an image including many edges. The vertical axis on the right side represents the percentage of the distance measurement error (in the drawing, "depth error") in the case of using a photographed image of an object which has a weak texture for distance measurement, such as an image including few edges.

In either of the textures, the error increases as the imaging position increases from 50%. As seen from FIG. 12, in the case where securing the accuracy in distance measurement is desired, the imaging position is set to 50-70%, whereby the distance measurement error can be 10% or less of what is caused when the imaging position is 50%. When the imaging position is 50-80%, the proportion of the range in which the distance can be measured on the anterior side and the posterior side of the imaging position can be set as freely as possible, without greatly deteriorating the distance measurement accuracy. Although FIG. 12 shows the results of the error obtained in the case where the imaging position is shifted to the far position side from the midpoint position between the near position and the far position, the same results would also be obtained in the case where the imaging position is shifted to the near position side from the midpoint position between the near position and the far position.

Thus, in order to set the range more freely such that the distance can be measured on the anterior side and the posterior side of the imaging position, the ratio between the distance between the imaging position and the far position and the distance between the imaging position and the near position can be set within the range of 2:8 to 1:1 or 1:1 to 8:2. Further, in order to sufficiently secure the accuracy in distance measurement, the ratio between the distance between the imaging position and the far position and the distance between the imaging position and the near position can be set within the range of 3:7 to 1:1 or 1:1 to 7:3.

Figure 13:
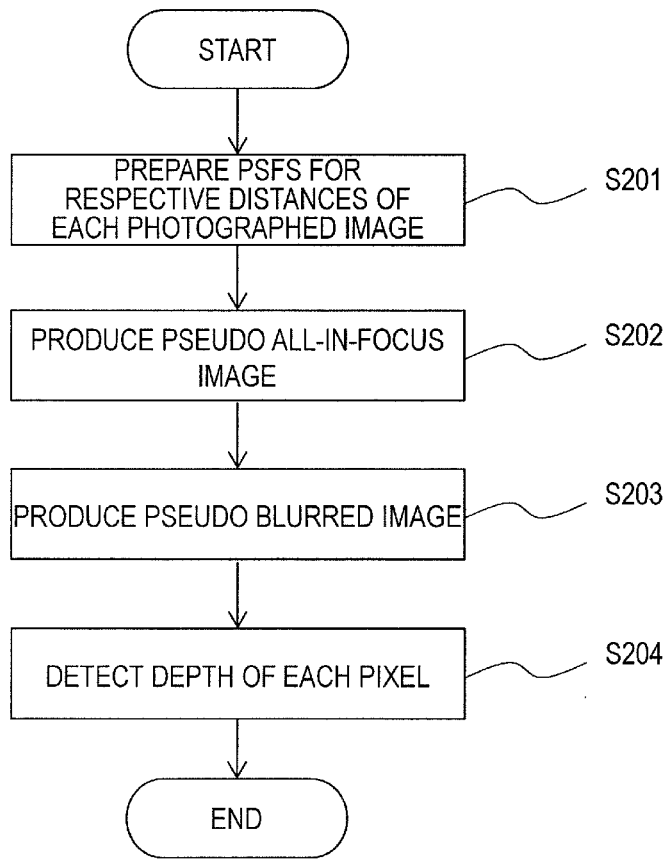
FIG. 13 is a flowchart illustrating an operation method for distance measurement.

Next, a method for carrying out measurement of the distance at each pixel from the view image, the far position image, and the near position image and obtaining a depth image is described with reference to FIG. 13. FIG. 13 is a flowchart illustrating the procedure of the distance measurement. Firstly, beforehand, the point spread functions (PSF) for respective distances of each photographed image are measured in advance (S201). The focus is adjusted to each of the view image, the far position image, and the near position image. Point light sources placed at respective distances to be measured are photographed with the focus being moved, and the PSF is measured from the amount of a blur of the photographed image. In the case where an image is analyzed over 32 grayscale levels (N=32), for example, the point light sources are placed at positions where the object distances are d1 to dN, and 32 sets of PSFs are obtained, each set including PSFs for the cases where the imaging positions are at d1 to dN and PSFs at the far position and the near position. As a result, PSFs for respective images shown below are obtained. The PSFs depend on the lens optical system of the imaging apparatus. Thus, it is only necessary to obtain the PSFs once before using the imaging apparatus. It is carried out in manufacture of the imaging apparatus, for example.

$$\begin{cases} psf_{Near}^{d1}, \ldots, psf_{Near}^{dN} \\ psf_{Middle}^{d1}, \ldots, psf_{Middle}^{dN} \\ psf_{Far}^{d1}, \ldots, psf_{Far}^{dN} \end{cases}$$ [Expression 1]

The following steps are carried out every time a view image is obtained. First, a pseudo all-in-focus image AIF is produced (S202). This is obtained by the following formula:

$$AIF^{di} = \frac{I_{Near} \cdot \overline{psf_{Near}^{di}} + I_{Middle} \cdot \overline{psf_{Middle}^{di}} + I_{Far} \cdot \overline{psf_{Far}^{di}}}{|psf_{Near}^{di}|^2 + |psf_{Middle}^{di}|^2 + |psf_{Far}^{di}|^2 + |C|^2}$$ [Expression 2]

where $I_{Near}$, $I_{Middle}$, and $I_{Far}$ are the near position image, the view image, and the far position image which are produced in every image frame. C is an adaptation term called plier.

Expression 2 is written in the form of a frequency space expression. Specifically, both an image and a PSF are converted into a frequency domain and calculated according to Expression 2, and thereafter, they are re-converted into a spatial domain, whereby the pseudo all-in-focus image AIF can be calculated.

Next, on the pseudo all-in-focus image AIF, $psf^{d1}$ to $psf^{dN}$ for the respective distances are convoluted to produce a pseudo blurred image (S203). As a result, a pseudo far position image, a pseudo near position image, and a pseudo view image, which are produced on the assumption that all of the objects are at specific distances (d1 to dN), are obtained.

Thereafter, as shown in Expression 3, the depth (distance) of each pixel is determined from the error between these images and actually-photographed images. In Expression 3, (x, y) represents the position of a pixel on an image. The value of d with which the total of the square errors for respective pixels between the actually-photographed far position image, near position image, and view image and the pseudo images thereof is the minimum is the depth of respective pixels. In this way, the distance can be determined for every pixel, and the depth image can be obtained.

$$d(x, y) = \underset{di}{\operatorname{argmin}} \begin{bmatrix} \{AIF^{di}(x, y) \otimes psf_{Near}^{di}(x, y) - I_{Near}(x, y)\}^2 + \\ \{AIF^{di}(x, y) \otimes psf_{Middle}^{di}(x, y) - I_{Middle}(x, y)\}^2 + \\ \{AIF^{di}(x, y) \otimes psf_{Far}^{di}(x, y) - I_{Far}(x, y)\}^2 \end{bmatrix}$$ [Expression 3]

As described hereinabove, according to the present embodiment, three images are obtained, and the distance is measured, whereby an imaging apparatus can be realized which is capable of distance measurement with high accuracy over a wider range. Further, according to the present embodiment, a movie image can be photographed at the rate of ½ as compared with usual movie image photographing, and in each frame image which is a constituent of the movie image, the distances to objects which are anterior or posterior to an object to which the focus is adjusted can be measured.

The present invention is not limited to the above-described embodiment but may be variously modified. Further, although in the above-described embodiment the position of the focus in the image capturing scene is changed by driving the focus lens such that the distance between the focus lens and the imaging plane of the imaging device is changed, the position of the focus in the image capturing scene may be changed by driving the imaging device such that the distance between the focus lens and the imaging plane of the imaging device is changed.

Figure 14:
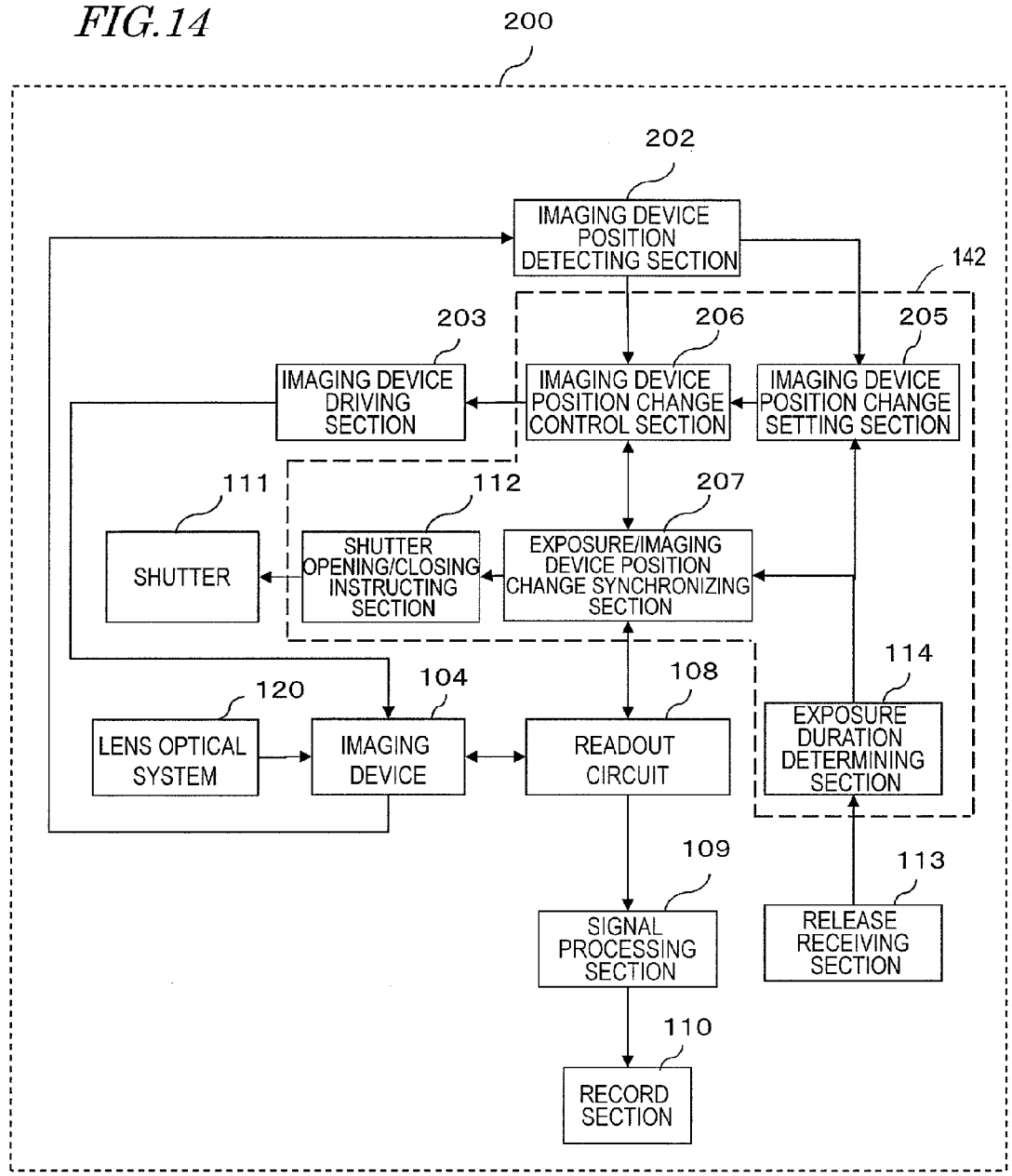
FIG. 14 is a block diagram showing an imaging apparatus of another embodiment.

FIG. 14 is a block configuration diagram showing an imaging apparatus 200 of the present embodiment. Components which are the same as those of the imaging apparatus 100 shown in FIG. 7 are designated by the same reference numerals. The imaging apparatus 200 is different from the imaging apparatus 100 in that the distance between the lens optical system 120 and the focus lens 101 is changed by moving the position of the imaging device 104. To this end, the imaging apparatus 200 includes an imaging device position detecting section 202, an imaging device driving section 203, an imaging device position change setting section 205, an imaging device position change control section 206, and an exposure/imaging device position change synchronizing section 207.

The imaging device position detecting section 202 includes a position sensor for detecting the position of the imaging device 104 and outputs a detection signal to the imaging device position change control section 206. The imaging device position change setting section 205 sets a position change pattern for the imaging device 104 and designates it as the position of a target imaging device. Then, the imaging device position change control section 206 calculates the driving signal from the difference between the position of the target imaging device and the current position of the imaging device 104 which is detected by the imaging device position detecting section 202 and outputs the calculated driving signal to the imaging device driving section 203.

When the release receiving section 113 receives an exposure start instruction from a user, the exposure duration determining section 114 determines the exposure duration of the imaging device 104. Also, the exposure duration determining section 114 outputs information about the exposure duration to the exposure/imaging device position change synchronizing section 207.

The exposure/imaging device position change synchronizing section 207 outputs instructions, based on the information about the exposure duration, to the shutter opening/closing instructing section 112, the imaging device position change control section 206, and the readout circuit 108 such that exposure, driving of the imaging device 104, and reading of electric signals from the imaging device 104 are carried out at a synchronized timing. Specifically, the synchronizing section 207 gives the shutter opening/closing instructing section 112 instructions about the timing of exposure and the exposure duration. Meanwhile, the synchronizing section 107 gives the imaging device position change control section 206 instructions about the timing of driving the imaging device 104 and the driving duration. Thus, the imaging apparatus 200 can drive the imaging device 104 to change the distance between the imaging plane of the imaging device and the focus lens and photograph the view image, the far position image, and the near position image.

The imaging apparatus, integrated circuit, and imaging method disclosed in the present application are suitably applicable to, for example, imaging apparatuses, such as digital still cameras and digital movie cameras for consumer use or professional use.

While the present invention has been described with respect to exemplary embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This application is based on Japanese Patent Applications No. 2012-261412 filed on Nov. 29, 2012 and No. 2013-213771 filed on Oct. 11, 2013, the entire contents of which are hereby incorporated by reference.

What is claimed is:

1. An imaging apparatus, comprising:
   an imaging device which has an imaging plane and which is configured to generate an image signal from light that is incident on the imaging plane;
   a lens optical system including a focus lens for condensing light toward the imaging device;
   a driving section configured to drive one of the imaging device and the focus lens so as to change a position to which a focus is adjusted on an object side;
   a shutter provided at at least one of the imaging device or a position between the lens optical system and the imaging device; and
   a control unit configured to control the shutter and the driving section,
   wherein the control unit drives the imaging device or the focus lens such that a focus is adjusted to each of first, second and third focusing positions of different object distances and controls the shutter and the driving section such that image signals of first, second and third object images at the first, second and third focusing positions are obtained by the imaging device,
   the first focusing position is present between the second focusing position and the third focusing position, and
   the control unit controls the shutter and the driving section such that the first object image is photographed in every other frame, and the second object image and the third object image are alternately photographed in every other frame.

2. The imaging apparatus of claim 1, wherein the control unit controls the shutter and the driving section such that the imaging device produces any of the first object image, the second object image, or the third object image in every image frame of the imaging device.

3. The imaging apparatus of claim 1, wherein
   the control unit controls opening and closing of the shutter such that the first object image, the second object image, or the third object image is obtained in a portion of each image frame, and
   the control unit controls the driving section such that a focusing position changes between the first focusing position and the second focusing position or between the second focusing position and the third focusing position in another portion of the each image frame.

4. The imaging apparatus of claim 1, wherein
   when the focus lens is focused on the first, second and third focusing positions, the driven imaging device or focus lens is at the first, second and third driving positions, respectively, and the control unit determines the second and third driving positions such that the distance between the first driving position and the second driving position and the distance between the first driving position and the third driving position are equal to each other.

5. The imaging apparatus of claim 1, wherein
when the focus lens is focused on the first and third focusing positions, the driven imaging device or focus lens is at the first and third driving positions, respectively,
when the focus lens is focused at a minimum focus distance, the driven imaging device or focus lens is at a fourth driving position, and
when the distance between the first driving position and the fourth driving position is shorter than the distance between the first driving position and the third driving position, the control unit controls the driving section such that the driven imaging device or focus lens is moved to the fourth driving position, and an image signal of the second object image is obtained by the imaging device.

6. The imaging apparatus of claim 1, wherein
when the focus lens is focused on the first and second focusing positions, the driven imaging device or focus lens is at the first and second driving positions, respectively, and
when the focus lens is focused on an infinity, the driven imaging device or focus lens is at the fifth driving position, and
when the distance between the first driving position and the fifth driving position is shorter than the distance between the first driving position and the second driving position, the control unit controls the driving section such that the driven imaging device or focus lens is moved to the fifth driving position, and an image signal of the third object image is obtained by the imaging device.

7. The imaging apparatus of claim 1, wherein
when the focus lens is focused on the first, second and third focusing positions, the driven imaging device or focus lens is at the first, second and third driving positions, respectively, and
the control unit determines the second and third driving positions based on an instruction from a user such that the distance between the first driving position and the second driving position and the distance between the first driving position and the third driving position are in a ratio between 1:1 to 8:2 or between 1:1 to 2:8.

8. The imaging apparatus of claim 1, further comprising a signal processing section which is configured to generate a signal of a movie image which is formed by the first object image photographed in every other frame and generate a signal of distance information in the first object image photographed in every other frame based on the first, second and third object images.

9. The imaging apparatus of claim 1, wherein the control unit sets the second and third focusing positions according to a variation in the first focusing position which is based on an instruction from a user or an autofocus function.

10. A semiconductor integrated circuit of an imaging apparatus including an imaging device which has an imaging plane and which is configured to generate an image signal from light that is incident on the imaging plane, a lens optical system including a focus lens for condensing light toward the imaging device, a driving section configured to driving one of the imaging device and the focus lens so as to change a position to which a focus is adjusted on an object side, and a shutter provided at at least one of the imaging device or a position between the lens optical system and the imaging device,
wherein the semiconductor integrated circuit drives the imaging device or the focus lens such that a focus is adjusted to each of first, second and third focusing positions of different object distances, and
the semiconductor integrated circuit controls the shutter and the driving section such that image signals of first, second and third object images at the first, second and third focusing positions are obtained by the imaging device,
the first focusing position is present between the second focusing position and the third focusing position, and
the semiconductor integrated circuit controls the shutter and the driving section such that the first object image is photographed in every other frame, and the second object image and the third object image are alternately photographed in every other frame.

11. The semiconductor integrated circuit of claim 10, wherein the semiconductor integrated circuit controls the shutter and the driving section such that the imaging device produces any of the first object image, the second object image, or the third object image in every image frame of the imaging device.

12. The semiconductor integrated circuit of claim 10, wherein
the semiconductor integrated circuit controls opening and closing of the shutter such that the first object image, the second object image, or the third object image is obtained in a portion of each image frame, and
the semiconductor integrated circuit controls the driving section such that a focusing position changes between the first focusing position and the second focusing position or between the second focusing position and the third focusing position in another portion of the each image frame.

13. The semiconductor integrated circuit of claim 10, wherein
when the focus lens is focused on the first, second and third focusing positions, the driven imaging device or focus lens is at the first, second and third driving positions, respectively, and
the semiconductor integrated circuit determines the second and third driving positions such that the distance between the first driving position and the second driving position and the distance between the first driving position and the third driving position are equal to each other.

14. An imaging method, comprising forming an image of an image capturing scene by exposing an imaging plane of an imaging device, which is configured to generate an image signal from incident light, to light incoming through a lens optical system which includes a focus lens at a timing of a shutter which is provided at at least one of the imaging device or a position between the lens optical system and the imaging device,
wherein the imaging device or the focus lens is driven such that a focus is adjusted to each of first, second and third focusing positions of different object distances, and one of the imaging device and the focus lens is driven such that image signals of first, second and third object images at the first, second and third focusing positions are obtained by the imaging device,
the first focusing position is present between the second focusing position and the third focusing position, and
the shutter is controlled, and one of the imaging device and the focus lens is driven, such that the first object image is photographed in every other frame, and the second object image and the third object image are alternately photographed in every other frame.

15. The imaging method of claim 14, wherein the shutter is controlled, and one of the imaging device and the focus lens is driven, such that the imaging device produces any of the first object image, the second object image, or the third object image in every image frame of the imaging device.

16. The imaging method of claim 14, wherein opening and closing of the shutter is controlled such that the first object image, the second object image, or the third object image is obtained in a portion of each image frame, and one of the imaging device and the focus lens is driven such that a focusing position changes between the first focusing position and the second focusing position or between the second focusing position and the third focusing position in another portion of the each image frame.

17. The imaging method of claim 14, wherein when the focus lens is focused on the first, second and third focusing positions, the driven imaging device or focus lens is at the first, second and third driving positions, respectively, and the second and third driving positions are determined such that the distance between the first driving position and the second driving position and the distance between the first driving position and the third driving position are equal to each other.

* * * * *